United States Patent [19]

Walters et al.

[11] Patent Number: 4,986,060
[45] Date of Patent: Jan. 22, 1991

[54] MODULAR ROTARY MOWER CUTTERBAR INCORPORATING UNIQUE IDLER GEAR MOUNTING

[75] Inventors: James C. Walters; Craig A. Richardson; Michael J. Verhulst, all of Ottumwa, Iowa

[73] Assignee: Deere & Company, Moline, Ill.

[21] Appl. No.: 531,606

[22] Filed: Jun. 1, 1990

[51] Int. Cl.⁵ ............................................. A01D 34/76
[52] U.S. Cl. ........................................... 56/6; 56/13.6
[58] Field of Search ................... 56/6, 12.3, 13.6, 13.8, 56/255, 295, DIG. 6, DIG. 17; 74/606 R; 403/370

[56] References Cited

U.S. PATENT DOCUMENTS

| | | | |
|---|---|---|---|
| 3,916,725 | 11/1975 | Reber | 74/606 R |
| 4,426,828 | 1/1984 | Neuerburg | 56/13.6 |
| 4,693,061 | 9/1987 | Koch et al. | 56/13.6 |
| 4,838,014 | 6/1989 | Koch et al. | 56/13.6 |

Primary Examiner—Ramon S. Britts
Assistant Examiner—Terry Lee Melius

[57] ABSTRACT

A rotary mower includes a cutterbar having a fluid-tight gear housing made up of a plurality of identical gear housing sections connected together in end-to-end relationship with each other. Each section is a casting including spaced apart top and bottom walls, the top wall being provided with a pair of circular openings and the bottom wall being provided with a pair of upwardly opening cylindrical receptacles respectively located in axial alignment with the pair of openings and having respective annular upper ends defining bearing seating surfaces. Each idler gear has a bearing received in a central bore thereof and the assembled idler gear and bearing is located in a housing section such that the inner race of the bearing rests on a selected one of the seating surfaces and is held in place by means of a stub shaft tightly received in the bearing and in a selected one of the receptacles and having an enlarged head which is tightly received in the opening which is aligned with the receptacle. An o-ring seal is received in a groove located circumferentially in the head and operates to prevent leakage of lubricating fluid from the gear housing. A cap screw is threaded axially through the stub shaft and into the bottom wall of the module and operates to hold the stub shaft in place with its enlarged head being held tightly against the bearing. A second o-ring seal is provided at the bottom of each receptacle for preventing leakage along the cap screw.

6 Claims, 3 Drawing Sheets

MODULAR ROTARY MOWER CUTTERBAR INCORPORATING UNIQUE IDLER GEAR MOUNTING

BACKGROUND OF THE INVENTION

The present invention relates to rotary or disc mowers of a type including an elongate cutterbar, and more particularly relates to such a cutterbar constructed of a plurality of modules secured together in end-to-end relationship with one another.

On rotary mowers, the space available for the transmission of power to each cutting unit is very shallow. This is because the drive is below the cutting units which are kept as close and flat to the ground as possible for close cutting. Two types of cutting unit drives predominate, these being a cross-shaft drive with bevel gears and a spur gear drive. The spur gear drive is preferred since spur gears can be placed in a flat arrangement which makes it easier to achieve close cutting.

Known spur gear drive trains normally include either a plurality of series-arranged gears, some being idler gears and others being cutting unit drive pinions, or a plurality of series-arranged idler gears having drive pinions arranged parallel thereto and respectively meshed with respective ones thereof in accordance with the desired direction of rotation of a respective cutting unit.

U.S. Pat. No. 4,693,061 discloses a one-piece cutterbar defining a gear housing containing a spur gear drive train and featuring a structure for removably mounting each of the idler gears within the housing. This featured structure includes a first member having a cylindrical shank inserted through axially aligned holes machined in the top and bottom of the housing and having an enlarged head sealed against an outer top surface of the housing. A second member is received in a cylindrical cavity formed in the lower end of the shank of the first member and includes an enlarged head defining an annular groove receiving the lower end of the shank. A coupling bolt extends through an aperture in the first member and is threaded into the second member to thereby hold the first and second members together. A bearing is mounted to the center of an idler gear and is received on the shank of the first member.

This above-described idler gear mounting structure is not entirely satisfactory since the first and second members are specially shaped parts and since a total of three seals must be used to prevent lubrication fluid from leaking from the gear housing.

SUMMARY OF THE INVENTION

According to the present invention there is provided a novel structure for mounting idler gears in the gear housing of a rotary or disc mower cutterbar.

An object of the invention is to provide a relatively simple structure requiring but two seals for mounting an idler gear within the gear housing of a rotary mower cutterbar.

A more specific object is to provide a cutterbar, as described above, which is composed of a plurality of cast gear housing sections having respective bottom walls with which structures, forming a portion of that necessary for mounting idler gears within each housing section, is integrally cast.

Yet another object of the invention is to provide a structure for mounting an idler gear within a gear housing section which does not require that unduly close tolerances be kept for the structure to be effective.

These and other objects are accomplished by an idler gear mounting structure comprising a plurality of modules, which each include a cast housing section connected to the housing section of a neighboring module for making up a cutterbar gear housing, the sections each having a pair of openings cast into an upper wall thereof respectively in axial alignment with a pair of cylindrical receptacles cast integrally with a bottom wall thereof. Each opening is larger in diameter than the opening in the receptacle and a stub shaft having an enlarged head is sealingly received in the opening and tightly received in the receptacle and held in place by a cap screw that extends axially through the stub shaft and is threaded into the bottom wall of the housing section.

DESCRIPTION OF THE PREFERRED EMBODIMENT

Figure 1:
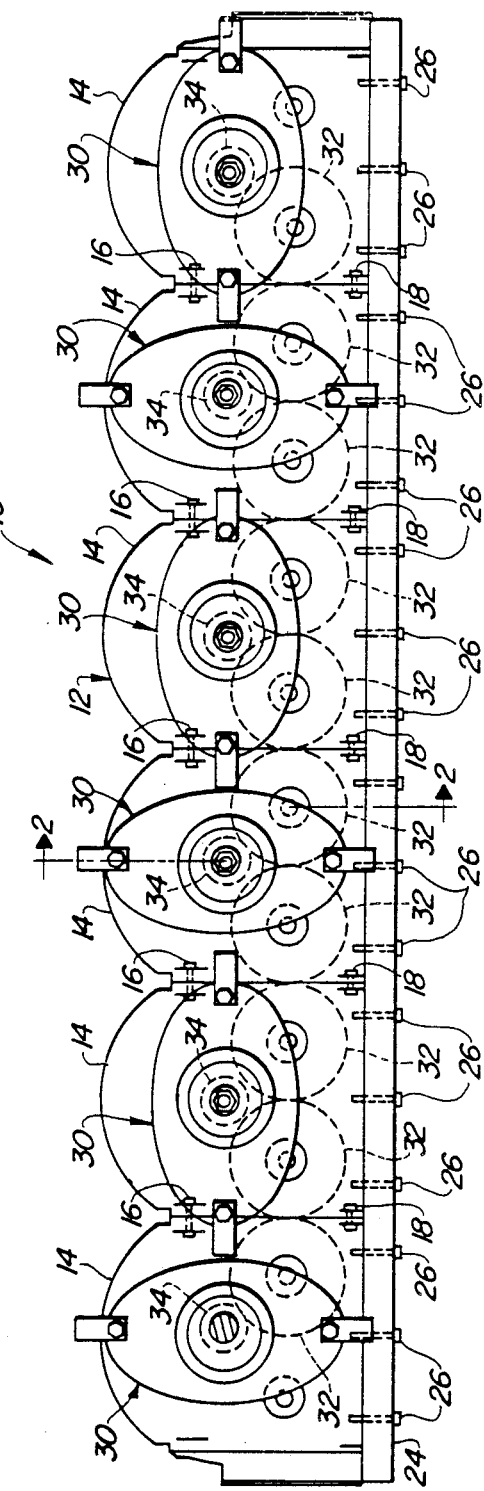
FIG. 1 is a top plan view of a cutterbar including a gear housing containing idler gears mounted in accordance with the principles of the present invention.

Referring now to FIG. 1, there is shown a cutterbar 10 for a rotary or disc mower including a housing 12 constructed of a plurality of modules which each include a housing section 14 having opposite ends delimited by planar fore-and-aft extending end faces secured in tight engagement with an adjacent end face of a neighboring section by means of front and rear bolts 16 and 18, respectively. Right and left end caps 20 and 22 are respectively secured to the right- and leftmost ones of the sections 14. A tubular stiffener beam 24 of rectangular cross section extends lengthwise of the cutterbar 10 and is secured, as by cap screws 26, to respective planar upright surfaces of rear walls 28 of the housing sections 14. Each of the sections 14 has a rotary cutting unit 30 mounted to a central location thereof for being driven by a series-parallel spur gear drive train composed of a continuous train of series arranged idler gears 32 and cutting unit drive pinions 34 arranged in parallel relative to the idler gears 32 and being meshed with selected ones of the idler gears in accordance with the desired direction of rotation of the cutting unit.

Figure 2:
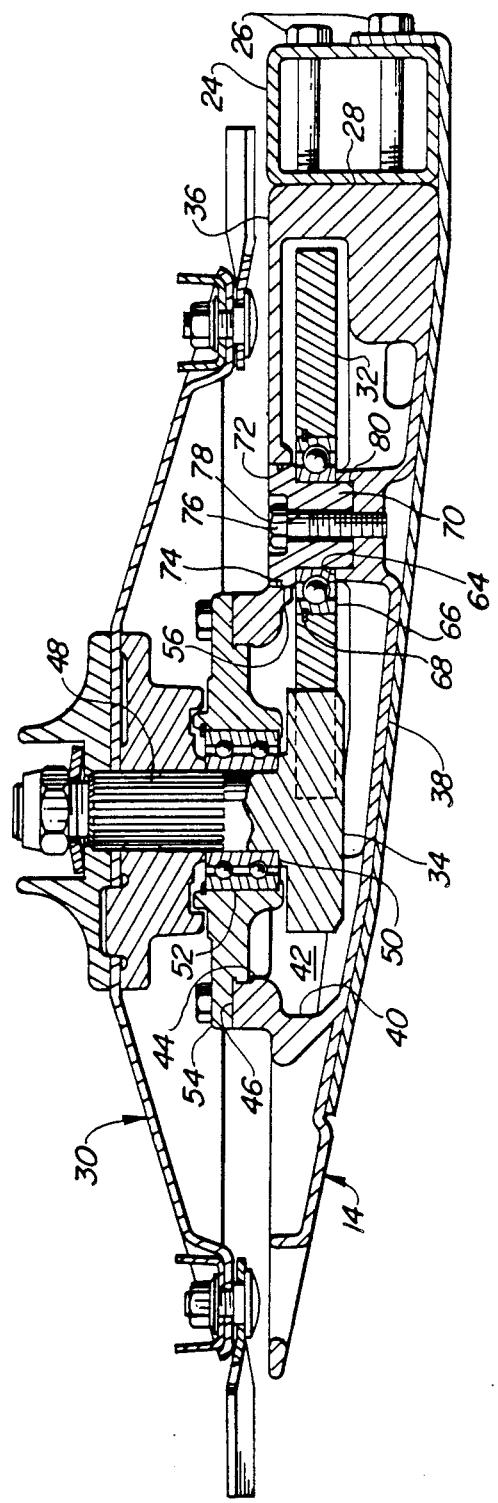
FIG. 2 is an enlarged vertical sectional view taken along line 2—2 of FIG. 1 but with the cutting unit and stiffener beam being omitted for simplicity.
Figure 3:
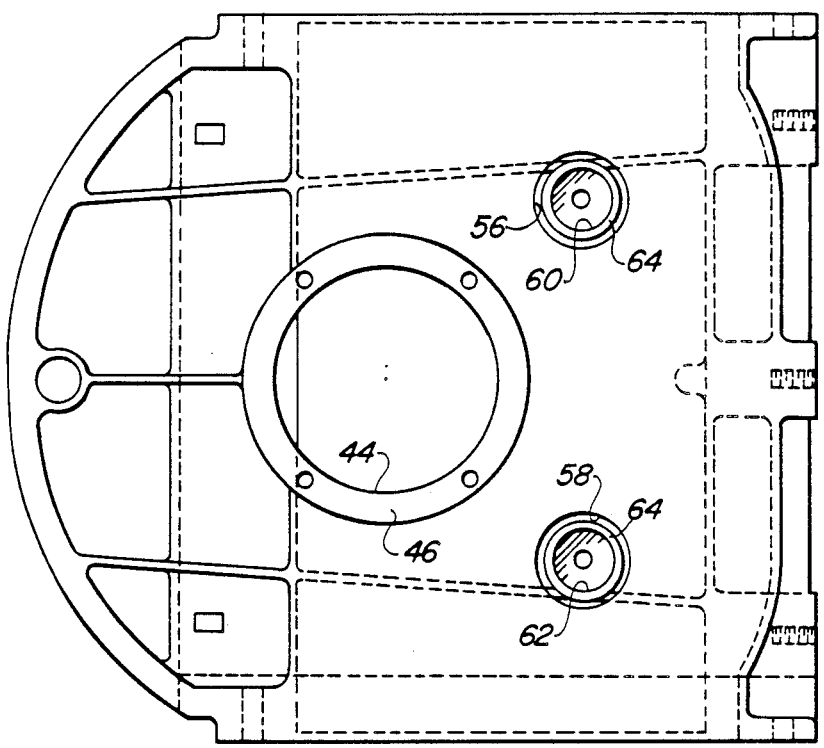
FIG. 3 is a top plan view of one of the cast housing sections which make up the gear housing of the cutterbar.

Referring now to FIGS. 2 and 3, it can be seen that each housing section 14 is wedge-shaped in vertical cross section and includes a generally horizontal top wall 36 and a bottom wall 38 which converge forwardly from the rear wall 28 to a forward wall 40 so as to define a cavity 42, with the cavities of adjacent modules cooperating to form the gear housing of the cutterbar. The top wall 36 is provided with a centrally located circular opening 44 which leads into the forward end of the cavity 42 and is bounded by an upwardly facing annular mounting surface 46. Each pinion 34 is formed at the lower end of a drive spindle 48 rotatably mounted in a bearing assembly 50 carried by a bearing housing 52 having an annular flange 54 that is removably secured against the surface 46 whereby the bearing housing, bearing assembly and spindle close the opening 44.

The gear housing sections 14 are each designed for having a pair of the idler gears 32 mounted thereinside, however it is noted that only one idler is required for the right- and leftmost sections 14 of the cutterbar 10. Specifically, each of the sections 14 includes right and left circular openings 56 and 58, respectively, located in the top wall 36 rearwardly of and equidistant from the opening 44. Formed on the interior of the bottom wall 38 of the section in axial alignment with the circular openings 56 and 58 are right and left cylindrical receptacles 60 and 62 which each include an annular bearing seating surface 64 formed at the top thereof. Each of the idler gears 32 has the outer race of a ball bearing 66 tightly received in a central bore thereof and held in place by a snap ring 68 which is received in complimentary grooves located in the gear and bearing race. Each of the idler gears 32 is positioned within the cavity 40 of a selected housing section 14 with the inner race of the associated bearing 66 engaging one of the seating surfaces 64 of a selected one of the receptacles 60 and 62. Tightly received in the inner race of the bearing 66 and in said one of the receptacles is a stub shaft 70 having an enlarged head 72 defining a downwardly facing surface engaged with the bearing inner race and being snugly received in the associated one of the cylindrical walls defining the openings 56 and 58. An o-ring seal 74 for preventing leakage of lubricant through the associated opening is received in a circumferential groove provided in the stub shaft head. A cap screw 76 extends through a bore 78 extending axially through the stub shaft 70 and is threaded into the bottom wall of the housing section 14 whereby the inner race of the bearing 66 is held tightly against the selected surface 64 by the head 72 of the stub shaft. An o-ring seal 80 is provided in the bottom of an associated one of the receptacles and acts to prevent leakage from the cavity by way of the bore 78.

Thus it will be appreciated that an effective but simple structure is provided for the mounting of idler gears within a fluid tight gear housing of a rotary cutterbar with only two seals being required per idler gear for preventing leakage of lubricant contained in the gear housing.

We claim:

1. In a rotary mower cutterbar including a gear housing containing a spur gear train including a plurality of idler gears having bearings mounted centrally thereto, mounting structure for each of said idler gears comprising: a circular opening provided in a top wall of the housing; a cylindrical receptacle formed integrally with a bottom wall of the housing in axial alignment with said opening and having an upper end defining an annular upwardly facing bearing seating surface; a stub shaft tightly received in an inner race of a bearing carried by one of said idler gears and in said receptacle; one side of said inner race being engaged with said bearing seating surface; and said stub shaft including an enlarged head engaged with another side of said inner race and being tightly disposed within said opening; and screw means being received in said stub shaft and said bottom wall for holding said enlarged head of the stub shaft tightly against said inner race of the bearing.

2. The rotary mower cutterbar defined in claim 1 and further including seal means disposed about the enlarged head of said stub shaft for preventing leakage of fluid from said housing along a path traversing said enlarged head.

3. The rotary mower cutterbar defined in claim 2 and further including a second seal means disposed in the bottom of said receptacle for preventing leakage from said housing along a path traversing the screw means.

4. In a rotary mower cutterbar including a gear housing made up of a plurality of open-ended hollow housing sections connected one to another, and a spur gear train including a plurality of idler and pinion gears being located in the housing and connected for driving a plurality of cutting units spaced along the length of the housing, an improved mounting structure for the idler gears comprising; each of said housing sections including at least one circular opening formed in a top wall thereof in axial alignment with a cylindrical receptacle formed integrally with a bottom wall thereof and having an upper end defining an annular bearing support surface; at least one of the idler gears being received in each housing section and carrying a centrally located bearing having an inner race positioned on said bearing support surface; a stub shaft tightly received in the inner race of the bearing and in the receptacle and including an enlarged head snugly received in said opening and engaged with the inner race of said bearing; and fastener means securing said stub shaft in place in said receptacle.

5. The rotary cutterbar defined in claim 4 wherein the enlarged head of the stub shaft is provided with a seal groove extending circumferentially thereabout; and an o-ring seal being disposed in said groove and engaging the top wall of the module at said opening.

6. The rotary cutterbar defined in claim 5 wherein a second o-ring seal is provided in said receptacle at a bottom end of the stub, shaft.

* * * * *